United States Patent
Sambongi et al.

(10) Patent No.: US 11,981,538 B2
(45) Date of Patent: May 14, 2024

(54) MARKING POSITIONING DEVICE FOR ELEVATOR

(71) Applicant: Mitsubishi Electric Corporation, Tokyo (JP)

(72) Inventors: Keisuke Sambongi, Tokyo (JP); Yu Enomoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 673 days.

(21) Appl. No.: 17/253,133

(22) PCT Filed: Aug. 24, 2018

(86) PCT No.: PCT/JP2018/031443
§ 371 (c)(1),
(2) Date: Dec. 17, 2020

(87) PCT Pub. No.: WO2020/039596
PCT Pub. Date: Feb. 27, 2020

(65) Prior Publication Data
US 2021/0261385 A1 Aug. 26, 2021

(51) Int. Cl.
*B64C 39/02* (2023.01)
*B64D 1/18* (2006.01)
(Continued)

(52) U.S. Cl.
CPC .......... *B66B 19/007* (2013.01); *B64C 39/024* (2013.01); *B64D 1/18* (2013.01);
(Continued)

(58) Field of Classification Search
CPC ......... B64D 1/18; B66B 19/00; B66B 19/007; B66B 1/3492; B64C 39/024; G05D 1/042;
(Continued)

(56) References Cited

U.S. PATENT DOCUMENTS

2012/0118219 A1  5/2012  Lindberg et al.
2017/0031369 A1  2/2017  Liu et al.
(Continued)

FOREIGN PATENT DOCUMENTS

CN  106687878 A  5/2017
JP  5-97346 A  4/1993
(Continued)

OTHER PUBLICATIONS

Machine translation of RU 2625691 C1, 2016, pp. 1-3 (Year: 2017).*

(Continued)

*Primary Examiner* — Anne Marie Antonucci
*Assistant Examiner* — Jared C Bean
(74) *Attorney, Agent, or Firm* — XSENSUS LLP

(57) ABSTRACT

There is provided a marking positioning device for an elevator which is capable of easily performing marking at a designated position inside a hoistway. The marking positioning device for an elevator includes a body portion that flies inside the hoistway of an elevator, a detecting unit provided at the body portion and configured to detect a position of the body portion inside the hoistway, a measuring unit provided at the body portion and configured to measure a three-dimensional shape inside the hoistway, a marking unit provided at the body portion and configured to perform marking, and a control unit provided at the body portion and configured to control flight of the body portion on the basis of the position detected by the detecting unit so that a position of marking by the marking unit is located at a designated position set in the three-dimensional shape measured by the measuring unit.

20 Claims, 7 Drawing Sheets

(51) Int. Cl.
  *B64U 10/13*   (2023.01)
  *B64U 101/00*  (2023.01)
  *B66B 19/00*   (2006.01)
  *F16C 29/02*   (2006.01)
  *F16M 13/02*   (2006.01)
  *G01B 11/24*   (2006.01)
  *G05D 1/00*    (2006.01)
  *B66B 1/34*    (2006.01)

(52) U.S. Cl.
  CPC ............ *F16C 29/02* (2013.01); *F16M 13/02* (2013.01); *G01B 11/24* (2013.01); *G05D 1/042* (2013.01); *B64U 10/13* (2023.01); *B64U 2101/00* (2023.01); *B66B 1/3492* (2013.01)

(58) Field of Classification Search
  CPC ......... F16C 29/02; F16M 13/02; G01B 11/24; B64U 10/13; B64U 2101/00
  See application file for complete search history.

(56) References Cited

U.S. PATENT DOCUMENTS

| 2017/0122723 | A1* | 5/2017 | Enomoto | G01B 11/005 |
| 2017/0248967 | A1  | 8/2017 | Krogh et al. | |
| 2017/0259912 | A1* | 9/2017 | Michini | G08G 5/0069 |

FOREIGN PATENT DOCUMENTS

| JP | 2012-218864 A | 11/2012 |
| JP | 5170424 B2 | 3/2013 |
| JP | 2015-30604 A | 2/2015 |
| JP | 6188065 B2 | 8/2017 |
| JP | 2018-128278 A | 8/2018 |
| KR | 10-1738430 B1 | 5/2017 |
| RU | 2625691 C1 * | 7/2017 |
| WO | 2017/207597 A1 | 12/2017 |

OTHER PUBLICATIONS

Office Action dated Mar. 21, 2022, in corresponding Korean patent Application No. 10-2021-7003479, 10 pages.
Tsun Kit Hui et al, "Autonomous Elevator Inspection with Unmanned Aerial Vehicle", 2016 3rd Asia-Pacific World Congress on Computer Science and Engineering, IEEE Computer Society, Dec. 2016, pp. 26-33.
Chinese Office Action dated Dec. 29, 2021, in corresponding Chinese Patent Application No. 201880096671.9.
Office Action dated Aug. 25, 2021, in corresponding Indian patent Application No. 202047051441, 6 pages.
International Search Report and Written Opinion dated Oct. 16, 2018, received for PCT Application No. PCT/JP2018/031443, Filed on Aug. 24, 2018, 8 Pages including English Translation.
Office Action dated Sep. 25, 2023 in corresponding Indian Patent Application No. 202047051441, citing above—listed references, 3 pages.

* cited by examiner

MARKING POSITIONING DEVICE FOR ELEVATOR

CROSS-REFERENCE TO RELATED APPLICATION

The present application is based on PCT filing PCT/JP2018/031443, filed Aug. 24, 2018, the entire contents of which are incorporated herein by reference.

FIELD

The present invention relates to a marking positioning device for an elevator.

BACKGROUND

PTL 1 discloses a marking positioning device for an elevator. According to this marking positioning device for an elevator, it is possible to perform marking at a designated position inside a hoistway.

CITATION LIST

Patent Literature

[PTL 1] JP H5-97346 A

SUMMARY

Technical Problem

However, the marking positioning device disclosed in PTL 1 is required to be moved along a guide rail. Therefore, there is a case where it is difficult to perform marking depending on locations in the hoistway.

The present invention has been made to solve the above-described problem. An object of the present invention is to provide a marking positioning device for an elevator which is capable of easily performing marking at a designated position inside a hoistway.

Solution to Problem

A marking positioning device for an elevator according to the present invention includes a body portion that flies inside a hoistway of an elevator, a detecting unit provided at the body portion and configured to detect a position of the body portion inside the hoistway, a measuring unit provided at the body portion and configured to measure a three-dimensional shape inside the hoistway, a marking unit provided at the body portion and configured to perform marking, and a control unit provided at the body portion and configured to control flight of the body portion on the basis of the position detected by the detecting unit so that a position of marking by the marking unit is located at a designated position set in the three-dimensional shape measured by the measuring unit.

Advantageous Effects of Invention

According to the present invention, flight of the marking positioning device is controlled so that the position of marking is located at the designated position set in the three-dimensional shape. It is therefore possible to easily perform marking at the designated position inside the hoistway.

DESCRIPTION OF EMBODIMENTS

Figure 1:
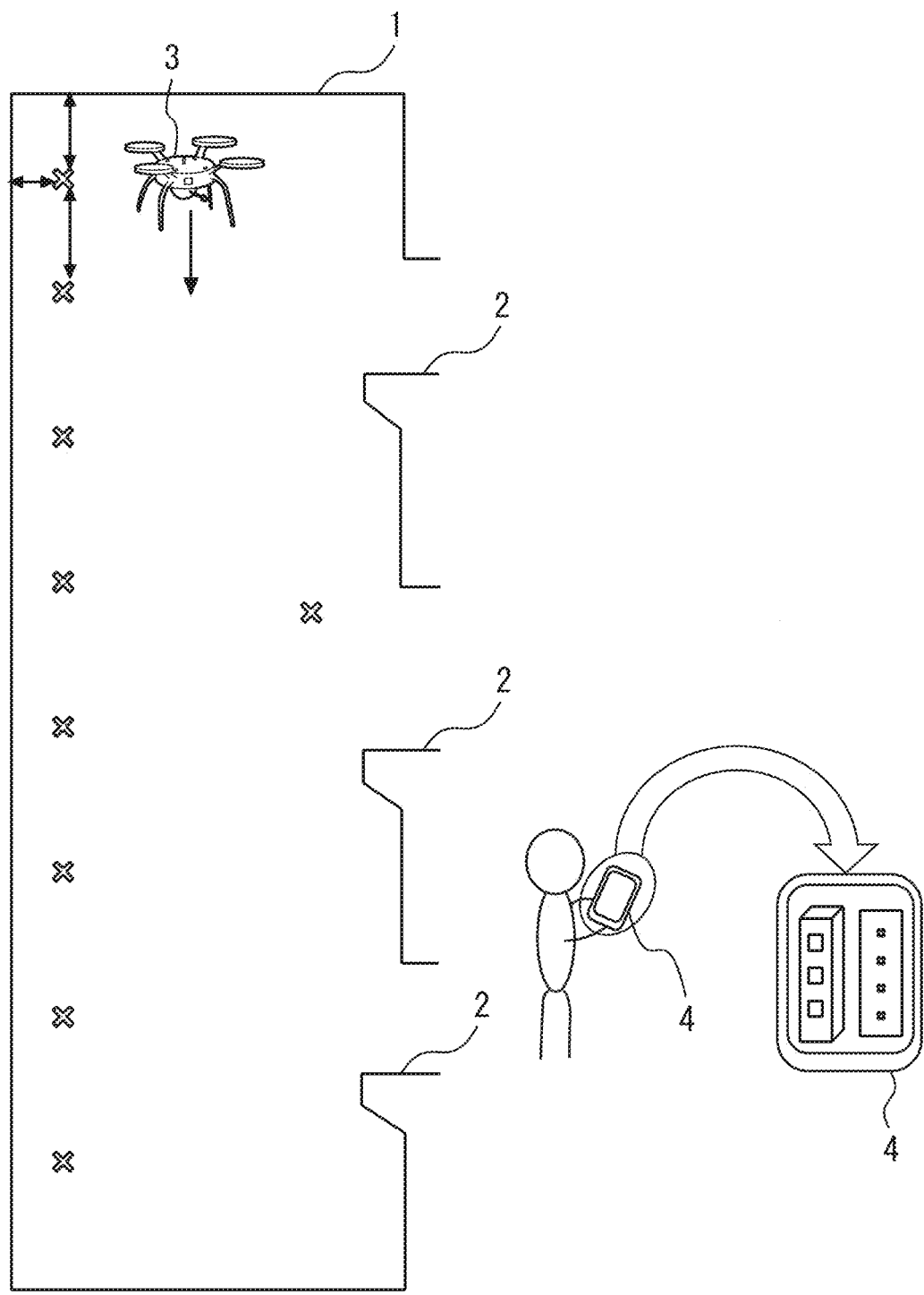
FIG. 1 is a vertical sectional drawing of a hoistway of an elevator system to which a marking positioning device for an elevator according to a first embodiment is applied.

Embodiments for implementing the present invention will be described in accordance with the accompanying drawings. Note that the same reference numerals will be assigned to identical or corresponding portions in the respective drawings. Repetitive descriptions of the portions will be simplified or omitted as appropriate.

First Embodiment

FIG. 1 is a vertical sectional drawing of a hoistway of an elevator system to which a marking positioning device for an elevator according to a first embodiment is applied.

In the elevator system in FIG. 1, a hoistway 1 pierces through floors of a building. Each of a plurality of halls 2 is provided at each floor of the building. Each of the plurality of halls 2 faces the hoistway 1. For example, in a case of an elevator having two doors which face each other and an elevator having two doors which are perpendicular to each other, each of the plurality of halls 2 faces the hoistway 1 at each floor of the building.

When an elevator is, for example, newly constructed, renewed or renovated, a marking positioning device 3 measures a three-dimensional shape inside the hoistway 1 while flying inside the hoistway 1. The marking positioning device 3 makes marks for hammering anchor bolts, or the like, at designated positions inside the hoistway 1 while flying inside the hoistway 1.

For example, the marking positioning device 3 performs marking while flying inside the hoistway 1 on the basis of the designated positions set by a mobile terminal 4 of a worker.

The marking positioning device 3 will be described next using FIG. 2.

Figure 2:
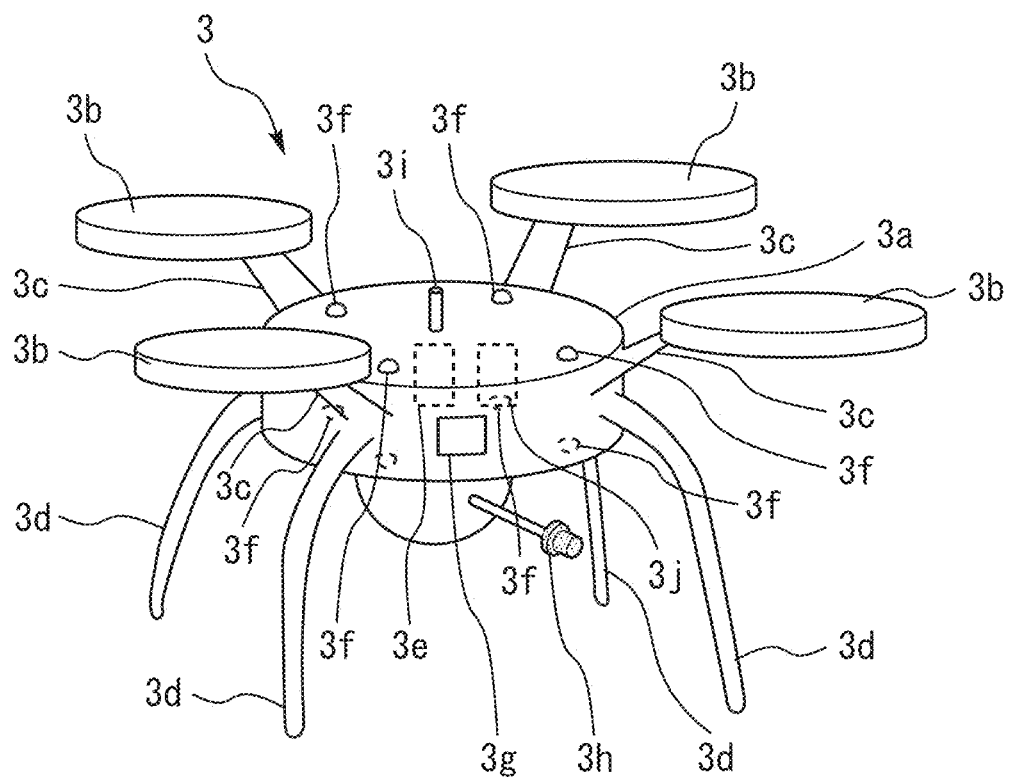
FIG. 2 is a perspective view of the marking positioning device for an elevator according to the first embodiment.

FIG. 2 is a perspective view of the marking positioning device for an elevator according to the first embodiment.

As illustrated in FIG. 2, the marking positioning device 3 includes a body portion 3a, a plurality of rotary wing portions 3b, a plurality of wing support portions 3c, a plurality of leg portions 3d, a power supply unit 3e, a plurality of detecting units 3f, a measuring unit 3g, a marking unit 3h, a communication unit 3i, and a control unit 3j.

For example, the body portion 3a is formed in a columnar shape. The plurality of rotary wing portions 3b are provided to rotate so that the body portion 3a can fly. The plurality of wing support portions 3c are provided so as to be able to respectively support the plurality of rotary wing portions 3b. The plurality of leg portions 3d are provided so as to be able to support the body portion 3a upon landing of the body portion 3a.

For example, the power supply unit 3e is provided inside the body portion 3a. The power supply unit 3e is provided so as to be able to supply power necessary for operation of the marking positioning device 3. For example, the power supply unit 3e is a storage battery which stores power from outside.

For example, the plurality of detecting units 3f in a first set are provided at equal intervals near an edge portion on an upper surface of the body portion 3a. For example, the plurality of detecting units 3f in a second set are provided at equal intervals near an edge portion on a lower surface of the body portion 3a. Each of the plurality of detecting units 3f is provided so as to be able to detect a position of the body portion 3a. For example, each of the plurality of detecting units 3f is a GPS receiver, a laser rangefinder, an altimeter, or the like.

For example, the measuring unit 3g is provided on a side surface of the body portion 3a. The measuring unit 3g is provided so as to be able to measure a three-dimensional shape inside the hoistway 1. For example, the measuring unit 3g is a device including an RGB camera and an infrared camera.

For example, the marking unit 3h is provided on the lower surface of the body portion 3a. The marking unit 3h is provided so as to be able to perform marking. For example, upon contact with an object, the marking unit 3h is provided so as to be able to perform marking by attaching a marking material to the object while absorbing a shock with elastic force. For example, the marking unit 3h is provided so as to be able to perform marking by causing a paintball filled with a marking material to hit the object. For example, the marking unit 3h is provided so as to be able to perform marking by spraying a marking material to the object as being performed by a spray gun configured with a nozzle, a compressed gas and a paint bottle.

For example, the communication unit 3i is provided on an upper surface of the body portion 3a. The communication unit 3i is provided so as to be able to wirelessly exchange information with external devices.

For example, the control unit 3j is provided inside the body portion 3a. The control unit 3j is provided so as to be able to wholly control the marking positioning device 3.

For example, the control unit 3j is provided so as to be able to control flight of the marking positioning device 3 in front-back and right-left directions by changing pitch angles of the plurality of rotary wing portions 3b with the plurality of wing support portions 3c. For example, the control unit 3j is provided so as to be able to control flight of the marking positioning device 3 in an up-down direction by changing rotation speed of the rotary wing portions 3b.

For example, the control unit 3j controls flight of the body portion 3a on the basis of the position detected by the detecting unit 3f so that a position of marking by the marking unit 3h is located at a designated position set in the three-dimensional shape measured by the measuring unit 3g.

For example, the control unit 3j is provided so as to be able to calculate the designated position on the basis of information on the three-dimensional shape measured by the measuring unit 3g and information on design of the elevator. In this calculation, a model of a car guide rail 5 which guides a car 6 which is not illustrated, a dimension of travel of the elevator, a dimension of a total height of the hoistway 1, a dimension in a width direction of the hoistway 1, a dimension in a depth direction of the hoistway 1, a direction of the hoistway 1, and the like, are taken into account as the information on the design.

For example, the control unit 3j is provided so as to be able to recognize a structure of the elevator on the basis of the three-dimensional shape measured by the measuring unit 3g and control flight of the body portion 3a using the structure as a standard so that the position of marking by the marking unit 3h is located at the designated position on a wall surface of the hoistway 1.

For example, the control unit 3j determines whether or not the position of marking recognized by the measuring unit 3g is located at the designated position set in the three-dimensional shape.

An example of the standard for positioning marking will be described next using FIG. 3.

Figure 3:
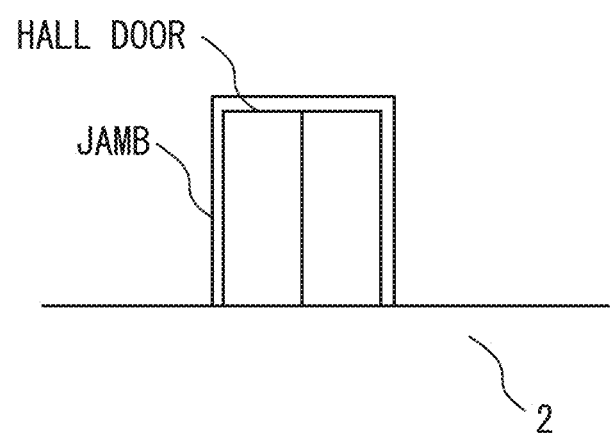
FIG. 3 is a front view of a hall of an elevator to which the marking positioning device for an elevator according to the first embodiment is applied.

FIG. 3 is a front view of a hall of an elevator to which the marking positioning device for an elevator according to the first embodiment is applied.

When the elevator is, for example, newly constructed, a structure is not positioned inside the hoistway 1 which is not illustrated in FIG. 3. In this case, as illustrated in FIG. 3, an edge portion of an entrance of the hall 2 is set as a structure which becomes a standard for positioning marking. The marking positioning device 3 recognizes both edge portions in a width direction of the entrance of the hall 2 on the basis of the three-dimensional shape measured by the measuring unit 3g while flying inside the hoistway 1. The marking positioning device 3 sets the center of the both edge portions in the width direction of the entrance of the hall 2 as the standard for positioning.

Outline of operation of the marking positioning device 3 will be described next using FIG. 4.

Figure 4:
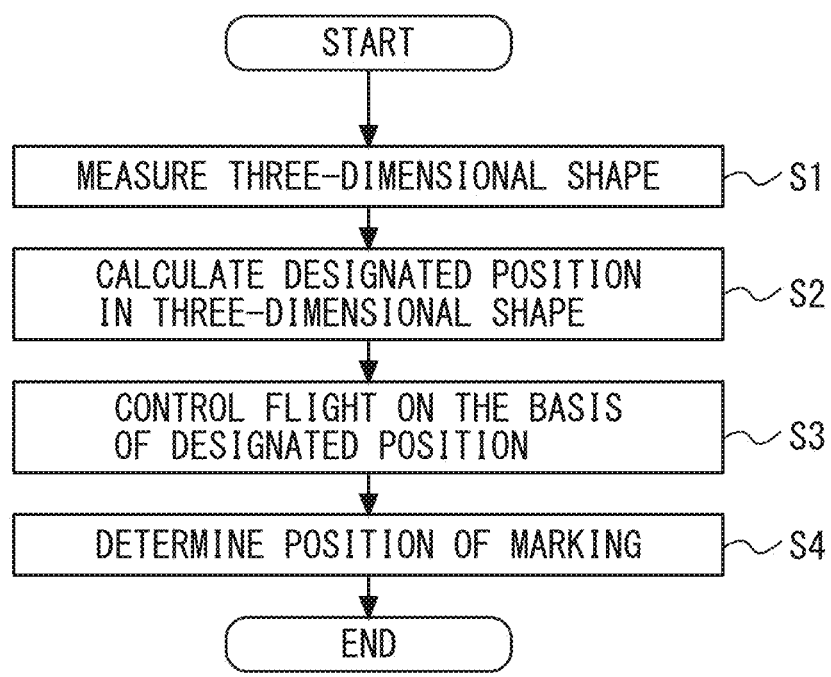
FIG. 4 is a flowchart for explaining outline of operation of the marking positioning device for an elevator according to the first embodiment.

FIG. 4 is a flowchart for explaining outline of operation of the marking positioning device for an elevator according to the first embodiment.

In step S1, the marking positioning device 3 measures the three-dimensional shape inside the hoistway 1 while flying. The marking positioning device 3 then performs operation in step S2. In step S2, the marking positioning device 3 calculates the designated position in the three-dimensional shape.

The marking positioning device 3 then performs operation in step S3. In step S3, the marking positioning device 3 controls flight on the basis of the designated position. The marking positioning device 3 then performs operation in step S4. In step S4, the marking positioning device 3 determines a position of marking while flying.

According to the first embodiment described above, flight of the marking positioning device 3 is controlled so that the position of marking is located at the designated position set in the three-dimensional shape. It is therefore possible to easily perform marking at the designated position inside the hoistway 1.

Further, the designated position is calculated on the basis of information on the measured three-dimensional shape and information on design of the elevator. It is therefore possible to appropriately perform marking in accordance with an actual situation of the elevator.

Further, flight of the marking positioning device 3 is controlled using the structure recognized on the basis of the measured three-dimensional shape as a standard. Specifically, the center of both edge portions in the width direction of the entrance of the hall 2 is set as the standard of positioning. It is therefore possible to perform marking more appropriately in accordance with an actual situation of the elevator.

Further, the marking positioning device 3 determines whether or not the position of marking is located at the designated position. It is therefore possible to easily recognize whether or not marking is appropriately performed.

Note that upon renewal, renovation, or the like, in a case where a jamb is left at the edge portion of the entrance of the hall 2, the center of both edge portions in a width direction of the jamb may be set as the standard for positioning. Also in this case, it is possible to perform marking more appropriately in accordance with an actual situation of the elevator.

Further, upon renewal, renovation, or the like, in a case where a hall door for opening and closing the entrance of the hall 2 is left, the center of the hall door may be set as the standard for positioning. Also in this case, it is possible to perform marking more appropriately in accordance with an actual situation of the elevator.

Further, upon contact with an object, the marking positioning device 3 attaches a marking material to the object while absorbing a shock with elastic force. It is therefore possible to suppress wobbling of the marking positioning device 3 upon marking.

Further, the marking positioning device 3 shoots a paintball filled with a marking material. It is therefore possible to perform marking without contacting a portion where the marking positioning device 3 is to perform marking.

Further, the marking positioning device 3 sprays a marking material. It is therefore possible to perform marking without contacting a portion where the marking positioning device 3 is to perform marking.

Note that marking may be performed through irradiation of lower-power laser light. In this case, it is possible to perform marking more accurately.

Note that power supply and information exchange may be performed in a wired manner. Also in this case, it is possible to easily perform marking at the designated position inside the hoistway 1.

Further, the marking positioning device 3 may be remotely operated on the basis of an external signal. Also in this case, it is possible to easily perform marking at the designated position inside the hoistway 1.

Further, information indicating the designated position set by the mobile terminal 4 of the worker may be wirelessly received at the communication unit 3i, and the designated position may be set on the basis of the information. Also in this case, it is possible to easily perform marking at the designated position inside the hoistway 1.

Second Embodiment

Figure 5:
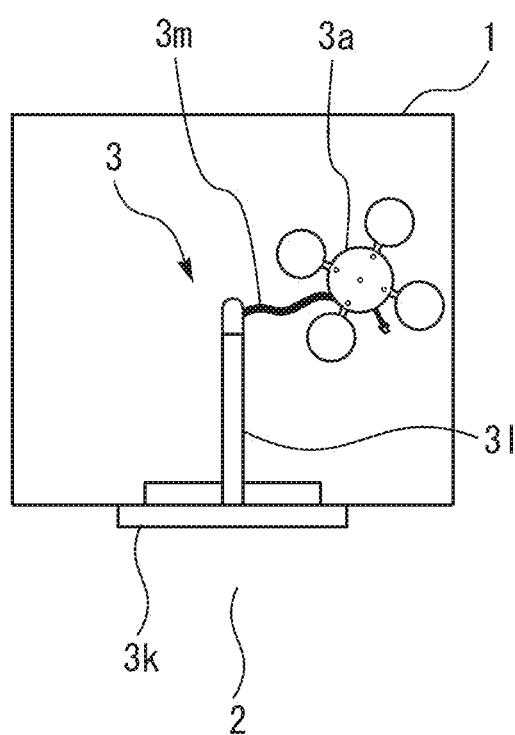
FIG. 5 is a cross-sectional view of a hoistway of an elevator system to which a marking positioning device for an elevator according to a second embodiment is applied.

FIG. 5 is a cross-sectional view of a hoistway of an elevator system to which a marking positioning device for an elevator according to a second embodiment is applied. Note that the same reference numerals will be assigned to portions which are identical with or correspond to the portions in the first embodiment. Description of the portions will be omitted.

The marking positioning device 3 of the second embodiment includes a support portion 3k, a projecting portion 3l, and a connecting portion 3m.

The support portion 3k is provided at the hall 2 so as not to drop inside the hoistway 1. For example, the support portion 3k is formed in a bar shape so as to be hooked at both edge portions of the entrance of the hall 2. The projecting portion 3l is connected to the support portion 3k. The projecting portion 3l is provided so as to project to inside of the hoistway 1. The connecting portion 3m is formed in a string shape. The connecting portion 3m connects a tip of the projecting portion 3l with the body portion 3a.

According to the second embodiment described above, the body portion 3a is connected to the connecting portion 3m. The connecting portion 3m is connected to the projecting portion 3l. The projecting portion 3l is connected to the support portion 3k. The support portion 3k is provided so as not to drop inside the hoistway 1. It is therefore possible to prevent the marking positioning device 3 from dropping inside the hoistway 1. As a result, it is possible to prevent equipment inside the hoistway 1 from being damaged due to drop of the marking positioning device 3.

Third Embodiment

Figure 6:
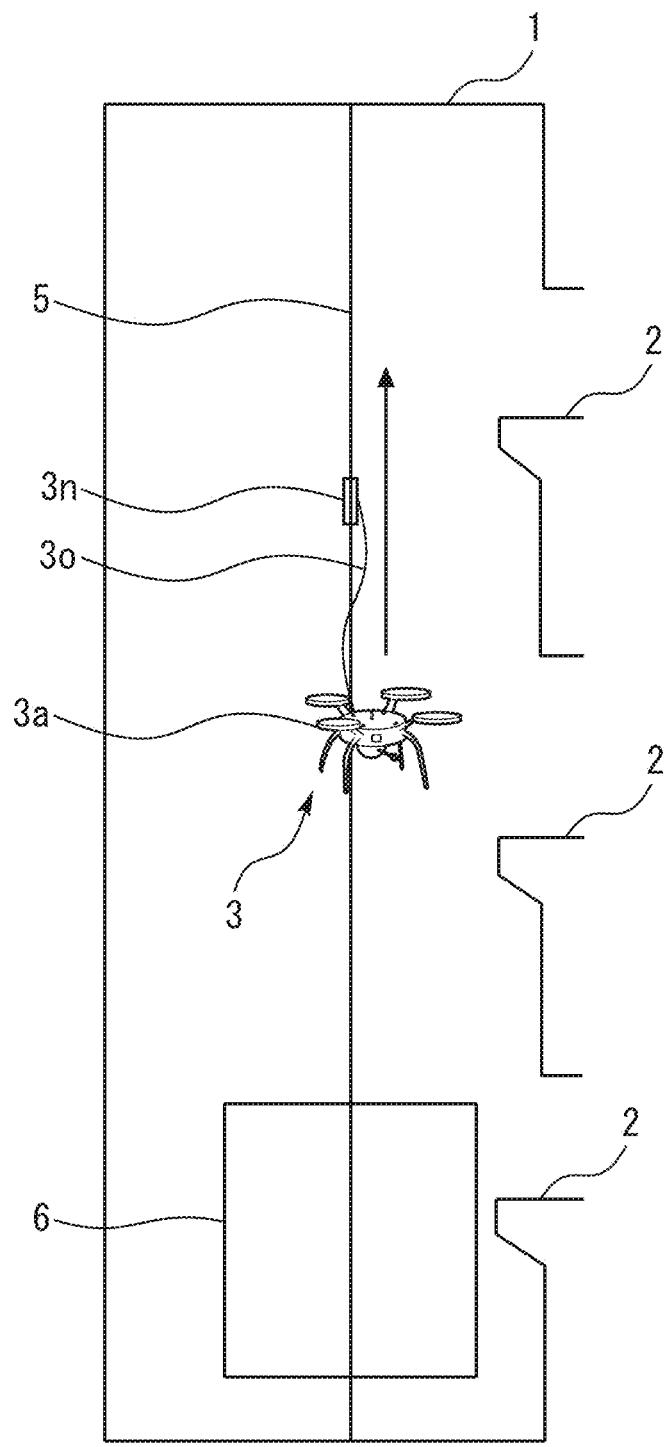
FIG. 6 is a vertical sectional drawing of a hoistway of an elevator system to which a marking positioning device for an elevator according to a third embodiment is applied.
Figure 7:
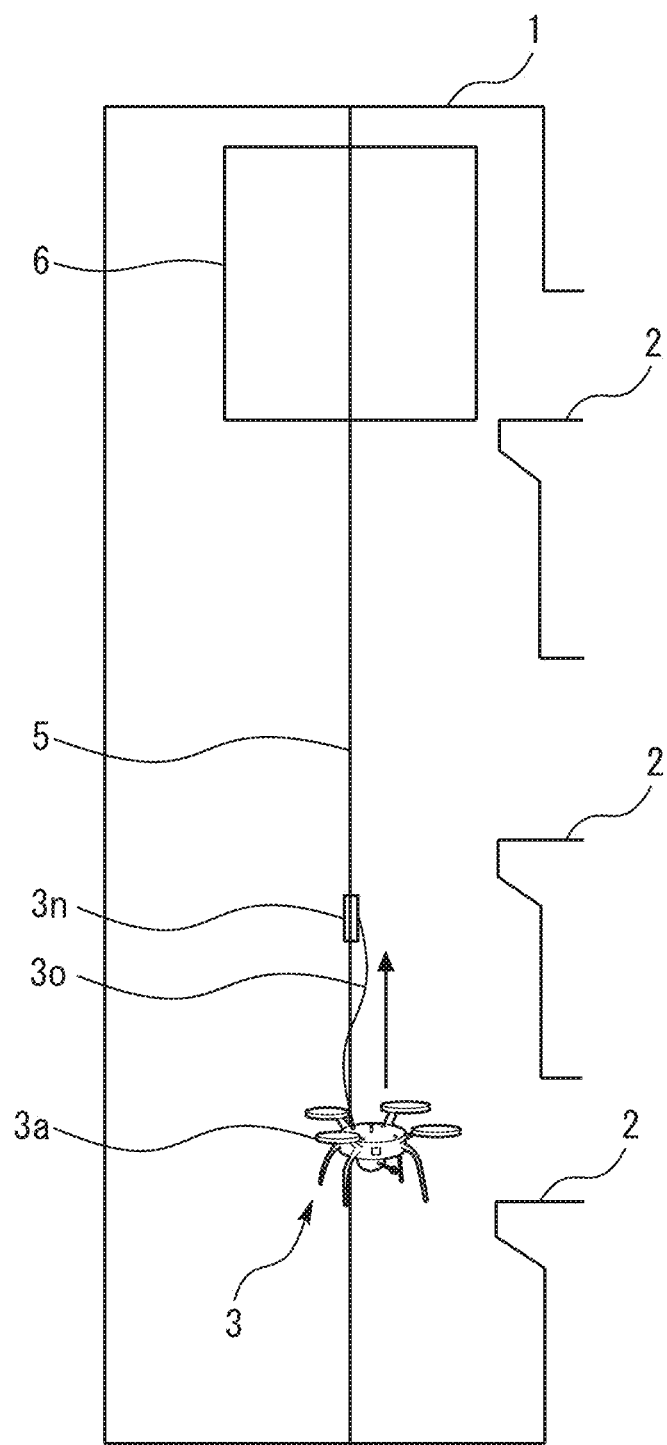
FIG. 7 is a vertical sectional drawing of the hoistway of the elevator system to which the marking positioning device for an elevator according to the third embodiment is applied.

FIG. 6 and FIG. 7 are vertical sectional drawings of a hoistway of an elevator system to which a marking positioning device for an elevator according to a third embodiment is applied. Note that the same reference numerals will be assigned to portions which are identical with or correspond to the portions in the first embodiment. Description of the portions will be omitted.

A pair of car guide rails 5 is provided from a lower portion to an upper portion of the hoistway 1 inside the hoistway 1. FIG. 6 and FIG. 7 illustrate only one of the pair of car guide rails 5. The car 6 is provided so as to be guided along the pair of car guide rails 5.

The marking positioning device 3 includes a gripping portion 3n and a connecting portion 3o.

The gripping portion 3n is provided so as to be able to grip the car guide rail 5. The connecting portion 3o is formed in a string shape. The connecting portion 3o is provided so as to be able to connect the gripping portion 3n with the body portion 3a.

Upon renewal, renovation, or the like, the pair of car guide rails 5 and the car 6 are sometimes left. In this case, as illustrated in FIG. 6, marking is performed at the upper portion of the hoistway 1 while the car 6 is evacuated to the lower portion of the hoistway 1. As illustrated in FIG. 7, marking is performed at the lower portion of the hoistway 1 while the car 6 is evacuated at the upper portion of the hoistway 1.

An example of the standard for positioning marking will be described next using FIG. 8.

Figure 8:
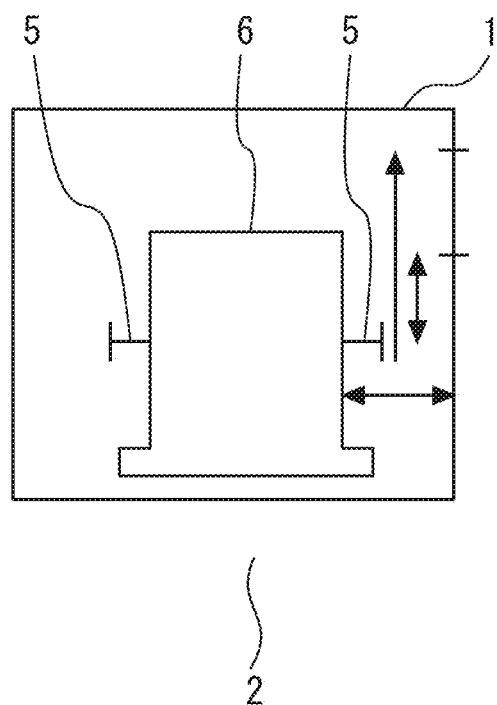
FIG. 8 is a cross-sectional view of the hoistway of the elevator system to which the marking positioning device for an elevator according to the third embodiment is applied.

FIG. 8 is a cross-sectional view of the hoistway of the elevator system to which the marking positioning device for an elevator according to the third embodiment is applied.

In a case where the pair of car guide rails 5 and the car 6 are left upon renewal, renovation, or the like, as illustrated in FIG. 8, one of the pair of the car guide rails 5 is set as a structure which becomes a standard for positioning in a depth direction of the hoistway 1. One side surface of the car 6 is set as a structure which becomes a standard for positioning in a width direction of the hoistway 1. The marking positioning device 3 recognizes one of the pair of car guide rails 5 and the one side surface of the car 6 while flying inside the hoistway 1. The marking positioning device 3 sets the recognized one of the pair of car guide rails 5 and one side surface of the car 6 as the standards for positioning.

According to the third embodiment described above, the car guide rails 5 are set as the standard for positioning. It is therefore possible to perform marking more appropriately in accordance with an actual situation of the elevator.

Note that it is also possible to set a weight guide rail which guides a counter weight as the standard for positioning. Also in this case, it is possible to perform marking more appropriately in accordance with an actual situation of the elevator.

Further, the body portion 3a is connected to the connecting portion 3o. The connecting portion 3o is connected to the gripping portion 3n. The gripping portion 3n grips the car guide rail 5. It is therefore possible to prevent the marking positioning device 3 from dropping inside the hoistway 1. As a result, it is possible to prevent equipment inside the hoistway 1 from being damaged due to drop of the marking positioning device 3.

Note that the gripping portion 3n may grip the weight guide rail. Also in this case, it is possible to prevent the marking positioning device 3 from dropping inside the hoistway 1. As a result, it is possible to prevent equipment inside the hoistway 1 from being damaged due to drop of the marking positioning device 3.

Further, the gripping portion 3n may grip a main rope which supports the car 6 and the counter weight. Also in this case, it is possible to prevent the marking positioning device 3 from dropping inside the hoistway 1. As a result, it is possible to prevent equipment inside the hoistway 1 from being damaged due to drop of the marking positioning device 3.

INDUSTRIAL APPLICABILITY

As described above, the marking positioning device for an elevator according to the present invention can be utilized in an elevator system.

REFERENCE SIGNS LIST

1 Hoistway
2 Hall
3 Marking positioning device
3a Body portion
3b Rotary wing portion
3c Wing support portion
3d Leg portion
3e Power supply unit
3f Detecting unit
3g Measuring unit
3h Marking unit
3i Communication unit
3j Control unit
3k Support portion
3l Projecting portion
3m Connecting portion
3n Gripping portion
3o Connecting portion
4 Mobile terminal
5 Car guide rail
6 Car

The invention claimed is:
1. A marking positioning device for an elevator, comprising:
a body that flies inside a hoistway of an elevator;
a detector at the body and configured to detect a position of the body inside the hoistway;
a marker at the body and to perform marking;
a control circuitry at the body and configured to control flight of the body on a basis of the position detected by the detector so that a position of marking by the marker is located at a designated position set in a three-dimensional shape inside the hoistway;
a support at a hall of the elevator so as not to drop inside the hoistway;
a projection connected to the support and projecting to inside of the hoistway; and
a connector having a string shape and connecting the projection with the body.

2. The marking positioning device for an elevator according to claim 1,
wherein the control circuitry calculates the designated position on a basis of information on the three-dimensional shape and information on design of the elevator.

3. The marking positioning device for an elevator according to claim 1, further comprising:
communication circuitry configured to wirelessly exchange information with an external apparatus,
wherein the control circuitry sets the designated position on a basis of information received at the communication circuitry from the external apparatus.

4. The marking positioning device for an elevator according to claim 1,
wherein the control circuitry recognizes a structure of the elevator on a basis of the three-dimensional shape and controls flight of the body using the structure as a standard so that the position of marking by the marker is located at the designated position.

5. The marking positioning device for an elevator according to claim 4,
wherein the control circuitry recognizes an edge portion of an entrance of a hall of the elevator as the structure.

6. The marking positioning device for an elevator according to claim 4,
wherein the control circuitry recognizes a jamb at an edge portion of an entrance of a hall of the elevator as the structure.

7. The marking positioning device for an elevator according to claim 4,
wherein the control circuitry recognizes a guide rail which guides a car or a counter weight of the elevator as the structure.

8. The marking positioning device for an elevator according to claim 1, wherein:
the control circuitry determines whether or not the position of the marking is located at the designated position.

9. The marking positioning device for an elevator according to claim 1,
wherein, upon contact with an object, the marker attaches a marking material to the object while absorbing a shock with elastic force.

10. The marking positioning device for an elevator according to claim 1,
wherein the marker shoots a paint ball filled with a marking material.

11. The marking positioning device for an elevator according to claim 1,
wherein the marker sprays a marking material.

12. A marking positioning device for an elevator, comprising:
a body that flies inside a hoistway of an elevator;

a detector at the body and configured to detect a position of the body inside the hoistway;
a marker at the body and to perform marking;
a control circuitry at the body and configured to control flight of the body on a basis of the position detected by the detector so that a position of marking by the marker is located at a designated position set in a three-dimensional shape inside the hoistway;
a gripper to grip a guide rail which guides a car or the counter weight of the elevator; and
a connector a string shape connecting the gripper with the body.

13. A method, comprising:
flying a body inside a hoistway of an elevator;
detecting a position of the body inside the hoistway;
measuring a three-dimensional shape inside the hoistway;
marking, by the body, a position inside the hoistway to create a mark;
controlling flight of the body on a basis of the position detected by the detecting so that the position of the mark is located at a designated position in a three-dimensional shape inside the hoistway; and
preventing the body from dropping inside of the hoistway by tethering the body using:
    a support at a hall of the elevator;
    a projection connected to the support and projecting to inside of the hoistway; and
    a connector having a string shape and connecting the projection with the body.

14. The method according to claim 13,
wherein the controlling calculates the designated position on a basis of information on the three-dimensional shape and information on a design of the elevator.

15. The method according to claim 13, further comprising:
    wirelessly exchanging information with an external apparatus,
wherein the controlling sets the designated position on a basis of information received from the external apparatus.

16. The method according to claim 13, wherein:
the controlling recognizes a structure of the elevator on a basis of the three-dimensional shape measured by the measuring and controls flight of the body using the structure as a standard so that the position of the mark is located at the designated position.

17. The method according to claim 16, wherein:
the controlling recognizes an edge portion of an entrance of a hall of the elevator as the structure.

18. The method according to claim 16, wherein:
the controlling includes recognizing a jamb at an edge portion of an entrance of a hall of the elevator as the structure.

19. The method according to claim 16, wherein:
the controlling includes recognizing a guide rail which guides a car or a counter weight of the elevator as the structure.

20. A method, comprising:
flying a body inside a hoistway of an elevator;
detecting a position of the body inside the hoistway;
measuring a three-dimensional shape inside the hoistway;
marking, by the body, a position inside the hoistway to create a mark;
controlling flight of the body on a basis of the position detected by the detecting so that the position of the mark is located at a designated position in a three-dimensional shape inside the hoistway; and
guiding the body up and down the hoistway by a string-shaped connector between the body which is connected to movable gripper which moves along a guide rail in the hoistway.

* * * * *